United States Patent Office 2,860,512
Patented Nov. 18, 1958

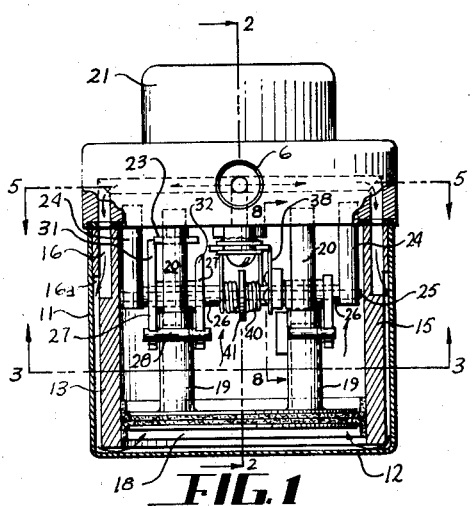

2,860,512
LIQUID METERS
Eric Hoerner, Dayton, Ohio
Application May 11, 1953, Serial No. 354,084
8 Claims. (Cl. 73—251)

This invention relates to meters and has for its object to provide a meter for use in gasoline or diesel powered trucks, buses, and fleet cars to record the exact amount of fuel consumed, in gallons and tenths of gallons, at any flow rate from zero to 50 gallons per hour, where slow flow accurate metering of fuels is desired.

It is a further object of this invention to provide a meter which is compact and made of any suitable material, especially aluminum or stainless steels. It is light, 10½ ounces. It is small, being 2¾ inches in diameter and 3⅜ inches high.

This meter can be attached or installed on the carburetor, in the fuel line between the carburetor and fuel pump, or in the line between the fuel pump and the tank.

It is also an object of the invention to provide a meter that will not leak, is a fool-proof, and is easily attached and detached.

These and other advantages will appear from the description taken in connection with the drawings in which:

Figure 1 is a view showing the head of the meter with parts cut away and the cylinder supported by the head in sections to show in part the passageways for the liquid to be measured.

Figure 2 is a section on line 2—2 of Figure 1, showing a piston in one extreme position adjacent the bottom of the cylinder.

Figure 3 is a section on line 3—3 of Figure 1.

Figure 4 is a view similar to Figure 2 with the piston in its extreme upward position.

Figure 5 is a section on line 5—5 of Figure 1.

Figure 6 is a top plan view of the metering device partly in sections.

Figure 7 is a section on line 7—7 of Figure 6.

Figure 8 is a view on line 8—8 of Figure 7.

The main parts of the meter consists of a head 1 and a body or cylinder 2 which is attached to the head by means of screws 3. In the head is an inlet 4 which has on its inner end an elbow 5 leading into the cylinder. In line with the linlet is an outlet 6 which has an elbow 7 spaced from the elbow 5 leading into the cylinder.

Transversely through the greater part of the head and at right angle to the direction of the inlet and outlet is a passageway 8 which has at its middle point a branch 9 between the elbows 5 and 7. On each end of the passageway 8 is an elbow 10 which leads into a hole or well 16 in the upper end of the cylinder wall. The cylinder is formed of two parts, an outer thin wall 11 and an inner thick wall 13 fitting in the outer wall. The outer wall of the cylinder has a bottom 12 from which the lower edge of the inner thicker wall is slightly spaced to provide a passageway 14 for the liquid being measured.

The lower two thirds of the thick or inner wall is reduced in size as indicated by the numeral 15 to provide an annular passageway. The thick wall 13 at the point where it is reduced in thickness has therein holes 16a leading from the wells 16 into the annular passageway 14. From the annular passageway 14 the liquid passes through the space 17 between the lower edge of the inner or thicker wall and the bottom of the outer wall to the cylinder.

In the cylinder is a piston 18 adapted to reciprocate in the cylinder by the pressure of the liquid thereon. On the upper side of the piston is a pair of spaced tubes 19, while on the head is a pair of stems 20 which fit in the tubes 19 on the cylinder.

On top of the head is an indicator 21 which has a shaft 22 for operating the indicator. This shaft has on its lower end within the cylinder an escapement cam 23 which operates the indicator.

On the head is a pair of posts 24 supporting a shaft 25 which has thereon between the posts a sleeve 26. On one end of the sleeve 26 is a pair of fixed bifurcated arms 27 which straddles a tube 19 and has in its bifurcations a pin 28 attached to the tube 19. On the other end of the sleeve 26 is a fixed bifurcated arm 29. In this bifurcation there is a pin 30 on the other tube 19. On the sleeve 26 in addition to the bifurcated arms there is an escapment lever 31, and also a second escapment lever 32 both fixed to the sleeve. These escapement levers are used to engage the escapement cam 23 mounted upon the end of the indicator shaft 22 for operating the indicator 21.

For connecting the inlet and outlet to the branch of the transverse passageway there is provided a valve 33 which is supported and held in close engagement with the head by the plate 34 and spring 34a. This plate is bifurcated at each end as indicated by the numeral 35, and is adapted to receive the grooved heads 36 of a pair of posts 37. Extending away from the plate is an arm 38. In the plate 34 is a pair of holes 39. Around the sleeve 26 is a pair of coil springs 40. One end of each spring is attached to a disc 41 fixed on the sleeve 26 while the other end of each spring is a prong which extends through holes 39 in the plate.

On the arm 38 is a rectangular restraining block 42 which cooperates with a similar restraining block 43 mounted on one of the tubes 19. The restraining block 43 is fixed on the piston and controls and determines the movement of the arm 38 and the valve plate. When the restraining block 43 reaches either the lower or upper limit of the restraining block 42 the valve plate through the action of the springs moves longitudinal and one restraining block passes over or under the other to assume a new position. This change of position on the part of the restraining blocks takes place at each end of the piston stroke. The changing of the valve is instantaneous.

With the parts of the apparatus in the positions indicated in Figure 2 the liquid is entering the inlet, and from the inlet it passes through the transverse passageway to the lower end of the cylinder beneath the piston, thereby forcing the piston up and forcing the liquid in the cylinder above the piston and out through the outlet. When the piston has reached the upper limit of its travel the valve member is shifted to the position shown in Figure 4. In this Figure 4 the liquid passes through the inlet into the upper end of the cylinder above the piston thereby forcing the piston downward. As the piston moves downward the liquid in the lower part of the cylinder passes up through the annular passageway then through the transverse passageway through the valve and out through the outlet. At the end of this operation the piston is again in the position shown in Figure 1. At the limit of the downward movement of the piston the valve is again shifted to the position shown in Figure 2.

This completes one cycle of operation.

The indicator shaft 22 is rotated by the engagement of the escapement levers 31 and 32 with the escapement cam 23, such levers striking adjacent corner regions of the triangular cam respectively in successive strokes of the piston and at opposite sides of the cam for rotative advancement in the same direction. The valve is shifted by the operation of the two springs located on the sleeve and actuated by the movement of the piston up and down. As the piston moves up and down the restraining blocks 42 and 43 move with relation to each other until one passes beyond the other at which time, due to the spring, the valve plate shifts to one of its extreme positions.

What I claim is:

1. In a fluid meter, a body in the form of a hollow cylinder closed at one end, a piston assembly in the cylinder, a head at the other end of the cylinder, said head and cylinder having a passageway leading from the cylinder on one side of the piston to the cylinder on the other side of the piston, said head having an inlet to the cylinder and an outlet therefrom, a valve member slidable on the head alternately to connect the inlet and the outlet to the passageway, reciprocably mounted support means for said valve member, spring means operatively connected to said support means, and restraining means including a member attached to the piston assembly for holding said support means against movement during travel of the piston between predetermined limits, the support means being released at such limits for actuation by the spring means and shifting of the valve member.

2. In a fluid meter, a body in the form of a hollow cylinder closed at one end, a piston assembly in the cylinder, a head at the other end of the cylinder, said head and cylinder having a passageway leading from the cylinder on one side of the piston to the cylinder on the other side of the piston, said head having an inlet to the cylinder and an outlet therefrom, a valve member slidable on the head alternately to connect the inlet and the outlet to the passageway, a supporting and operating slide to which said valve member is secured, spring means interconnected between the piston assembly and said slide, the piston movement being transmitted to the slide through said spring means, and means operative to hold the slide against movement during travel of the piston between predetermined limits and to release the same for actuation of the valve member at such limits, said last-named means including a member attached to the piston assembly for movement therewith.

3. In a fluid meter, a body in the form of a hollow cylinder closed at one end, a piston assembly in the cylinder, a head at the other end of the cylinder, said head and cylinder having a passageway leading from the cylinder on one side of the piston to the cylinder on the other side of the piston, said head having an inlet to the cylinder and an outlet therefrom, valve means comprising a valve member slidable on the head alternately to connect the inlet and the outlet to the passageway, means interconnecting said piston assembly and valve means for actuation of the valve member in response to predetermined piston movement, a rotatable generally triangular escapement member adapted to actuate register mechanism, and means having a connection to such means interconnecting the piston assembly and valve means for rotating said escapement member coincidentally with actuation of the valve member.

4. In a fluid meter including a piston, a valve, and fluid connections for alternately directing the fluid flow in the meter to opposite sides of the piston; an operating member for said valve, means supporting said member for reciprocation, spring means having a connection to said operating member, means operatively connecting the piston and the spring means for biasing of the latter in each stroke of the piston, a first detent carried by said operating member, and a second detent movable with the piston, the two such detents being slidably engaged over the desired piston stroke to restrain the operating member against movement and released at the respective ends of such stroke for actuation of the valve.

5. In a fluid meter including a piston, a valve, and fluid connections for alternately directing the fluid flow in the meter to opposite sides of the piston; a slide to which said valve is secured, means mounting said slide for guided reciprocation, spring means connected to the slide for actuating the same, means operatively connecting the piston and the spring means for biasing the latter in response to reciprocation of the piston, and cocking means carried by the piston for engaging and holding the slide against movement as the piston travels between predetermined limits, the slide being released at such limits for actuation by the stored spring energy thereby operatively to shift the valve.

6. In a fluid meter including a piston, a valve, and fluid connections for alternately directing the fluid flow in the meter to opposite sides of the piston; a slide to which said valve is secured, means mounting said slide for guided reciprocation, a pair of springs each having a connection to the slide, means operatively connecting the springs and the piston for biasing first one and then the other spring in successive strokes of the piston, thereby to reciprocate the slide, said slide having a detent portion, an extension secured to said piston and carrying a cooperable detent arranged for sliding engagement with the detent portion of the slide, such engagement holding the slide against movement during travel of the piston between predetermined limits, movement of the piston detent beyond the slide detent portion at the respective ends of the latter releasing the slide, whereupon the valve is actuated to reverse the piston movement, the engagement of the piston detent and the slide detent portion being shifted to opposite sides thereof.

7. In a fluid meter including a piston, a valve, and fluid connections for alternately directing the fluid flow in the meter to opposite sides of the piston; a slide to which said valve is secured, means supporting said slide for guided reciprocation, a pair of torsion springs each connected at one end to said slide, a shaft to which the other ends of said springs are attached, an extension secured to the piston, a pivotal connection between the shaft and the piston extension for turning of the shaft and hence biasing of said springs in response to reciprocation of the piston, and stop means including a member connected to the piston for holding the slide against the spring bias between predetermined limits of the piston travel, the slide being released by the stop means at such limits for actuation of the valve.

8. Apparatus as defined in claim 7 characterized further in the provision of a rotatable triangular escapement member adapted to drive register mechanism, and lever means secured to said shaft for engaging and turning said escapement member with rotation of the shaft.

References Cited in the file of this patent

UNITED STATES PATENTS

| 69,007 | Mason | Sept. 17, 1867 |
| 238,011 | West | Feb. 22, 1881 |
| 455,244 | Ahrbecker | June 20, 1891 |
| 1,534,238 | Mercier | Apr. 21, 1925 |

FOREIGN PATENTS

| 22,325 | Great Britain | 1891 |